United States Patent [19]
Ginsberg

[11] Patent Number: 6,110,996
[45] Date of Patent: Aug. 29, 2000

[54] BUILDING COMPOSITION AND METHOD FOR MAKING THE SAME

[76] Inventor: Murray Ginsberg, 6781 W. Sunrise Blvd., Plantation, Fla. 33313

[21] Appl. No.: 09/175,929

[22] Filed: Oct. 20, 1998

Related U.S. Application Data

[60] Provisional application No. 60/063,181, Oct. 20, 1997.

[51] Int. Cl.[7] .................................................. C08L 63/00
[52] U.S. Cl. .............................................................. 523/466
[58] Field of Search ............................................. 523/466

[56] References Cited

U.S. PATENT DOCUMENTS

| | | | |
|---|---|---|---|
| 3,848,655 | 11/1974 | Sato et la. ................................. | 164/43 |
| 4,086,098 | 4/1978 | LeRuyet et al. .......................... | 106/97 |
| 4,479,990 | 10/1984 | Dixon ........................................ | 428/36 |
| 4,487,805 | 12/1984 | Sellstrom ................................. | 428/413 |
| 4,686,252 | 8/1987 | Burge et al. ................................ | 524/3 |
| 4,689,358 | 8/1987 | Schorr et al. ............................. | 523/209 |
| 4,995,545 | 2/1991 | Wycesh ..................................... | 228/119 |
| 5,108,679 | 4/1992 | Rirsch ...................................... | 264/118 |
| 5,514,729 | 5/1996 | Diamant .................................... | 522/81 |
| 5,618,860 | 4/1997 | Mowrer ..................................... | 523/421 |

*Primary Examiner*—Paul R. Michl
*Attorney, Agent, or Firm*—Jo Katherine D'Ambrosio

[57] ABSTRACT

A method for producing a lightweight, water resistant composition for use in manufacturing building materials and the composition produced by such method. The method comprising mixing a first mixture comprising an epoxy resin, a lightweight aggregate, a UV absorber and preferably sodium bicarbonate and a viscosifer in a rotary mixer, rotating at a speed of at least 40 rpm. A second mixture of an epoxy hardener, a lightweight aggregate, a UV absorber and preferably sodium bicarbonate and a viscosifer are mixed in a rotary mixer rotating at a speed of at least 1000 rpm while pressurized air is pumped in until the second mixture is homogenized. The first and second mixtures are then combined and mixed while pressurized air is pumped in until the combined mixtures are homogenized. The mixing process preferably is performed in a centrifugal mixer comprising a co-rotating disk agitator just prior to the time of manufacturing the building materials. A preferred lightweight, water resistant composition produced by the method of this invention comprises a curable composition resulting from the first mixture and second mixture prepared in accordance with the method describe herein and then combined and mixed until homogenized.

30 Claims, No Drawings

BUILDING COMPOSITION AND METHOD FOR MAKING THE SAME

CROSS-REFERENCE TO A RELATED CASE

This application is a continuation of Provisional application, U.S. patent application Ser. No. 60/063,181 filed Oct. 20, 1997.

FIELD OF THE INVENTION

The present invention is directed to a method for producing a building composition and the composition produced by such method. Particularly, The method for producing a lightweight, water resistant composition for for use in manufacturing building materials and such composition.

BACKGROUND OF THE INVENTION

Materials such as cement block, floor tile, roof tile and driveway paves are commonly used in the construction industry. Usually such materials are made from a cement based composition to provide sufficient hardness and strength. However, because cement is considerably dense, materials made from a cement based composition tend to be heavy and friable. These negative chararcteristics add to the cost of shipping, as well as construction costs. Furthermore, cement based materials are prone to cracking and chipping during transport, resulting in a certain percentage of damage materials which cannot be used. Once installed, these materials are further subject to cracking or breaking if exposed to impact, vibration or fluctuations in temperature levels. Materials made with a cement base composition are poor insulators of sound and temperature.

Le Ruyet et al., U.S. Pat. No. 4,086,098, disclose a composition of matter comprising cellular aggregate distributed in a hardenable or hardened binder in which the aggregate consists of cellular glass beads.

Burge et al. disclose a process for preparing a building and/or construction material, a polymer modified aqueous dispersion, and its use thereof for the preparation of building materials. The process comprises admixing a stable aqueous dispersion containing a non-curing mixture of amorphous silicon dioxide and at least one polymer, with at least one inorganic binder.

SUMMARY OF THE INVENTION

A primary object of the present invention is to provide a method of producing a lightweight, water resistant composition for use in manufacturing building materials such as, not limited to, construction blocks, roof tile, floor tile, pavers and/or wall coverings exterior and interior.

It is a further object of the present invention to provide a lightweight, high strength composition which has ceramic-like qualities of durability and thermal insulation to be used as a coating over existing building materials.

The present invention resides, in part, in the surprising realization that the ceramic-like qualities of strength, hardness, durability, waterproofing and attractive appearance can be obtained in a composition for building materials without the firing required to produce ceramics. One embodiment of the method for producing a lightweight, water resistant composition for building materials comprises mixing a first mixture comprising an epoxy resin, a lightweight aggregate, and a UV absorber in a rotary mixer rotating at a speed of at least 40 rpm, mixing a second mixture comprising an epoxy hardener, a lightweight aggregate, and a UV absorber in a rotary mixer at a speed of at least 1000 rpm, and pumping in pressurized air until the second mixture is homogenized. The first mixture and the second mixture are combined in a rotary mixer, and mixed at a speed of at least 1000 rpm, while pressurized air is pumped in until the combined mixture is homogenized.

Preferably, the first mixture and the second mixture further comprise sodium bicarbonate and a viscosifier. In a preferred embodiment, the first mixture comprises the epoxy resin in an amount of a range of from about 55% to about 65% by weight of the first mixture, the lightweight aggregate in an amount of a range of from about 28% to about 32% by weight of the first mixture, the sodium bicarbonate in an amount of a range of from about 3% to about 5% by weight of the first mixture, the viscosifier in an amount of a range of from about 2% to about 4% by weight of the first mixture and the UV absorber in the amount of a range of from about 2% to about 4% by weight of the first mixture. The second mixture comprises the epoxy hardener in an amount of a range of from about 55% to about 65% by weight of the second mixture, the lightweight aggregate in an amount of a range of from about 28% to about 32% by weight of the second mixture, the sodium bicarbonate in an amount of a range of from about 3% to about 5% by weight of the second mixture, the viscosifier in an amount of a range of from about 2% to about 4% by weight of the second mixture and in the UV absorber in the amount of a range of from about 2% to about 4% by weight of the second mixture.

In a more preferred embodiment, the first mixture comprises the epoxy resin in an amount of about 60% by weight of the first mixture, the lightweight aggregate in an amount of about 30% by weight of the first mixture, the sodium bicarbonate in an amount of about 4% by weight of the first mixture, the viscosifier in an amount of about 3% by weight of the first mixture and the UV absorber in the amount of about 3% by weight of the first mixture and the second mixture comprises the epoxy hardener in an amount of about 60% by weight of the second mixture, the lightweight aggregate in an amount of about 30% by weight of the second mixture, the sodium bicarbonate in an amount of about 4% by weight of the second mixture, the viscosifier in an amount of about 3% by weight of the second mixture and in the UV absorber in the amount of about 3% by weight of the second mixture.

In an alternate embodiment, the viscosifier comprises an acrylic ester polymer and the epoxy resin comprises a derivative of bisphenol A and epichlorohydrin. The epoxy hardener can comprise and amine and the lightweight aggregate can comprise vermiculite. The UV absorber is preferably a substituted hydroxyphenyl benzotriazole. In the preferred method, the rotary mixer is a centrifugal disc mixer comprising a co-rotating disk agitation system.

In one aspect, the pressurized air is added while mixing the second mixture and is pumped in at a pressure within a range of from 1 psi to 3 psi for a time period within the range of from about 5 minutes to about 10 minutes. In another aspect, the pressurized air pumped into the combined first mixture and second mixture at less than 1 psi and is pumped in for a time period within the range of from about 3 minutes to about 15 minutes. Preferably, the combined first mixture and second mixture are mixed for a period of time of at least 20 minutes. A preferred lightweight, water resistant composition for building materials is prepared in accordance with the method describe herein.

In another preferred method for producing a lightweight, water resistant composition for building materials the steps comprise mixing a first mixture comprising an epoxy resin in an amount of about 60% by weight of the first mixture, a lightweight aggregate in an amount of about 30% by weight of the first mixture, and substituted hydroxyphenyl benzotriazole in the amount of about 3% by weight of the first mixture in a rotary mixer rotating at a speed of at least 40 rpm; mixing a second mixture comprising an epoxy hardener in an amount of about 60% by weight of the second mixture, a lightweight aggregate in an amount of about 30% by weight of the second mixture and substituted hydroxyphenyl benzotriazole in the amount of about 3% by weight of the second mixture in a rotary mixer at a speed of at lease 1000 rpm and pumping in pressurized air within a range of from 1 psi to 3 psi until the second mixture is homogenized; and combining the first mixture and the second mixture in a rotary mixer, mixing at a speed of at least 1000 rpm, and pumping in pressurized air at less than 1 psi until combined mixture is homogenized.

In this preferred method, the first mixture further comprises sodium bicarbonate in an amount of about 4% by weight of the first mixture and an acrylic ester polymer in an amount of about 3% by weight of the first mixture. Preferably, the second mixture further comprises sodium bicarbonate in an amount of about 4% by weight of the second mixture and an acrylic ester polymer in an amount of about 3% by weight of the second mixture. The preferred rotary mixer is a centrifugal disc mixer comprising a co-rotating disk agitation system. The combined first mixture and second mixture are mixed in this centrifugal disc mixer for a period of time of at least 20 minutes. The pressurized air can be pumped into the second mixture for a period of time ranging from about 5 minutes to about 10 minutes. Pressurized air can be pumped into the combined first mixture and second mixture for a period of time ranging from about 3 minutes to about 15 minutes. Preferably, the method of this invention further comprises applying the lightweight, water resistant composition as a coating on building materials. Alternatively, the method can include the steps of pouring the combined, homogenized mixtures into various molds for forming building materials; and allowing the combined, homogenized mixture of to harden before use.

The surprising result of the preferred method of this invention is a lightweight, water resistant composition for use as building materials.

DETAILED DESCRIPTION

The present invention is directed to a method for producing a light weight, water resistant composition for use in manufacturing building materials. The composition resulting from the method of this invention has ceramic-like qualities of hardness, strength, insulating properties, and durability without having to be cured by firing or heated to very temperatures normally required to cure the ingredients of this type of building material. The composition produced by the method of this invention can be applied as a coating for construction blocks or roof and floor tiles and coverings, wall boards and other building materials. The composition can also be used to manufacture building bricks, blocks, roofing tiles, pavers and the like.

In one embodiment of the method for producing a lightweight, water resistant composition for building materials, an epoxy resin first mixture is combined with an epoxy hardener second mixture. The second mixture is homogenized and has pressurized air added. The first and second mixtures can be produced and either used immediately or stored for future use. When the user is ready to manufacture building materials, the first mixture and the homogenized second mixture are combined and further homogenized, again with the addition of pressurized air. The mixing of all materials preferably occurs in a rotary mixer comprising a centrifugal disc mixer. The preferred centrifugal disc mixer is a high shear co-rotating agitation system.

The high shear co-rotating agitation system is preferred for solids degradation and mixing of liquefied suspensions. This preferred system has multiple discs with holes and the discs are placed asymmetrically within the system for increased agitation and mixing. The increased agitation results in increased homogenization of the mixtures. The rotating speeds of the rotary mixer vary depending on the mixture within the agitation system.

The first mixture preferably comprises an epoxy resin, a lightweight aggregate, and a UV absorber. The preferred epoxy resin is a derivative of bisphenol A and epichlorohydrin although other resins known in the art can be used. The epoxy resin is preferably in an amount of about a range of from about 55% to about 65% by weight of the first mixture. The lightweight aggregate can comprise vermiculite, perlite or lime deposit material.,preferably, the lightweight aggregate is in an amount of about a range of from about 28% to about 32% by weight of the first mixture. The UV absorber is preferably a substituted hydroxyphenyl benzotriazole, in an amount of about a range of from about 2% to a range of from about 3% to about 5% by weight of the first mixture, available under the tradename, TINUVIN 213®. Preferably, the first mixture further comprises small amounts of sodium bicarbonate and a viscosifier, the sodium bicarbonate in an amount of a range of from about 3% to about 5% by weight of the first mixture and the viscosifier in an amount of a range of from about 2% to a range of from about 3% to about 5% by weight of the first mixture. The viscosifier is preferably an acrylic ester polymer commonly sold under the tradename, ACRYLOID®.

The first mixture is mixed in a rotary mixer rotating at a speed of at least 40 rpm, preferably 60 rpm. The mixing time is preferably from 5 to 40 minutes, more preferably 15 minutes but can be increased as known in the art. The temperature is ambient temperature.

The second mixture comprises an epoxy hardener, a lightweight aggregate, and a UV absorber. The second mixture is mixed in a rotary mixer, preferably a centrifugal disc mixer as described above at a speed of at least 1000 rpm for about 10 to 50 minutes, preferably 15 minutes. During the mixing, pressurized air is pumped in until the second mixture is homogenized. The pressurized air can be pumped in at a pressure within a range of from 1 psi to 3 psi for a time period ranging from about 5 minutes to about 10 minutes, about 8 minutes is preferred. The temperature is ambient temperature. Preferably the second mixture further comprise sodium bicarbonate and a viscosifier, such as an acrylic ester polymer sold as ACRYLOID® for example. One preferred second mixture comprises a fatty acid polyamide and triethylenetetramine.

In a preferred embodiment, the second mixture comprises the epoxy hardener in an amount of 60% by weight of the second mixture, the lightweight aggregate, vermiculite or perlite for example, in an amount of 30% by weight of the second mixture, the sodium bicarbonate in an amount of a range of from about 3% to about 5% by weight of the second mixture, the viscosifier, in an amount of a range of from about 2% to a range of from about 3% to about 5% by weight of the second mixture and in the UV absorber in an amount of a range of from about 2% to a range of from about 3% to about 5% by weight of the second mixture. The epoxy hardener comprises an amine. The preferred epoxy hardener is available under the tradename, EPI-CURE® and comprises amine, clarified gar and other viscosifying agents. The first and second mixtures can be stored for future use in manufacturing building products. The mixtures can be made in five-gallon quantities for ease of handling and storing. The first mixture and second mixture are each separately packed and sealed in drums or cans. When the user is ready to manufacture the building material, the first mixture and the second mixture are combined in a rotary mixer and mixed at a speed of at least 1000 rpm, while pressurized air is pumped in until the combined mixture is homogenized. The ratio of the first mixture to the second mixture is a one to one ratio. Preferably, the pressurized air is pumped into the combined first mixture and second mixture at less than 1 psi and is pumped in for a time period within the range of from about 3 minutes to about 15 minutes. Preferably, the combined first mixture and second mixture are mixed in the centrifugal disc mixer for a period of time of at least 20 minutes.

A preferred lightweight, water resistant composition for building materials comprises a curable composition resulting from the first mixture and second mixture prepared in accordance with the method describe herein and then combined and mixed until homogenized.

The lightweight, water resistant composition produced according to the method of this invention can be applied as a coating on building materials such as cement building blocks, Styrofoam blocks, roofing tiles and wall boards for example. The coating results in a glazed, ceramic-like finish on the building materials. Alternatively, the resulting combined homogenized mixtures resulting from the method described above can include the steps of pouring the combined, homogenized mixtures into various molds for forming building materials such as bricks, tiles or pavers for example, and allowing the combined, homogenized mixture to harden before use.

After a period of 48 hours, the tensile strength of the resultant composition is 14,000 to 18,000 PSI. The composition is lightweight, extremely hard, fire-resistant, and an excellent insulator of sound and temperature.

EXAMPLES

TEST 1

Test Method: ASTM C1185-92, "Standard Test Method for Sampling and Testing Non-Asbestos Fiber-Cement Flat Sheet, Roofing and Siding Shingles, and Clapboards-Density".

Sample Identification: Six (6) nominally 2.0 by 2.0 by 1.8 inch cubes were identified and labeled as follows: red for non-homogenized material and yellow for homogenized (original formulas) material. The red cubes were labeled as G-1, G-2, G-5 and G-6, and the yellow cubes were labeled G-3 and G-4.

Conditioning: All samples were conditioned at test conditions of 70 F and 50% relative humidity for a minimum of 48 hours.

| Specimen ID | Density lb./ft 3 |
|---|---|
| G-1 | 49.970 |
| G-2 | 49.764 |

-continued

| Specimen ID | Density lb./ft 3 |
|---|---|
| G-3 | 50.306 |
| G-4 | 50.648 |
| G-5 | 50.954 |
| G-6 | 49.942 |

TEST 2

Test Method: ATM C579-91, "Standard Test Method for Compressive Strength of Chemical - Resistant Mortars. Grouts, Monolithic Surfacing and Polymer Concrete", Method B Sample Identification: Six (6) nominally 2.0 by 2.0 by 1.8 inch cubes were identified as red for non-homogenized material and yellow for homogenized material. The sample red cubes were labeled as G-1, G-2, G-5, and G-6, and yellow cubes were labeled G-3 and G-4. Individual compressive strengths were reported.

Conditioning: All specimens were conditioned for a minimum of 48 hours at 70 F and 50% relative humidity.

Test Device: Instron Model 1115 universal Testing Machine calibrated October 1995.

Load Capacity: 20,000 lbs.

Full Scale Load Range: 20,000 lbs.

Crosshead Speed: 0.2 in/min.

Results: The following table summarizes the results determined for each specimen having reached a defined yield point.

| Sample Identification | Minutes Mixed | Length (inch) | Width (inch) | Thickness (inch) | Load (lb.) | Compressive Strength (psi) |
|---|---|---|---|---|---|---|
| G-1 | 2+ | 2.008 | 1.988 | 1.777 | 15,500 | 3882.86 |
| G-2 | 2+ | 1.988 | 1.977 | 1.782 | 15,100 | 3841.97 |
| G-3 | 9 | 2.002 | 1.975 | 1.758 | 18,650 | 47163.38 |
| G-4 | 8 | 2.001 | 1.955 | 1.862 | 18,200 | 4652.41 |
| G-5 | 6 | 2.005 | 1.998 | 1.865 | 16,200 | 4043.91 |
| G-6 | 5 | 1.990 | 1.985 | 1.787 | 15,300 | 3873.27 |

Observations: The material cracked and crumbled at failure. No obvious defects were observed.

TEST 3

Project: Thermal Properties of Ginsite Roof Tile Material

Sample Identification:

One (1) 12 by 9 by 0.616 inch specimen was received and identified as Ginsite roof tile material.

Test Method:

Thermal transmission properties were determined in accordance with ASTM C 518-91, "Standard Test Method for Steady-State Heat Flux Measurements and Thermal Transmission Properties by Means of the Heat Flow Meter Apparatus". The specimens were tested in a Dynstach (Holometrix) Rapid-k heat flow meter at a mean temperature of 75 F and 50% relative humidity a minimum of 24 hours prior to testing unless otherwise specified. The specimen orientation was horizontal and the heat flux transducer was located on the cold surface.

Apparatus hear flux transducers are calibrated monthly using N.I.S.T traceable standard reference material 1450b for the above conditions. Apparatus thickness gages are calibrated monthly using precision gage blocks for the range of available thickness settings.

All data has been reported in inch-pound units. The estimated uncertainty in the reported values is within ±2.12% as determined by inter-laboratory testing conducted under the National Voluntary Laboratory Accreditation Program. This test conformed with all requirements of ASTM C 518-91.

Summary of Results:

ASTM C518 HEAT FLOW METER RESULTS

|  | Ginsite Sample 1 |
|---|---|
| Average Heat Flux, Btu/h ft 2 | 69.13 |
| Average Hot Surface Temperature, F. | 95.0 |
| Average Cold Surface Temperature, F. | 55.3 |
| Average Temperature Difference, F. | 39.7 |
| Mean Temperature, F. | 75.2 |
| Average Thickness, inch | 0.616 |
| Average Density, lb./ft | 59.6 |
| Average Thermal Resistance, h ft F./Btu | 0.57 |
| Average Thermal Conductance, Bru/h ft F. | 1.741 |
| Apparent Thermal Conductivity, Bru/h ft F. | 1.072 |

TEST 4

Flexural Properties of Ginsite Material

Test Method: ASTM C580-93, "Standard Test Method for Flexural Strength and Modulus of Elasticity of Chemical-Resistant Mortars, Grouts, Monolithic Surfacing and Polymer Concrete", Method B Sample Identification: Four (4) nominally 6 by 10 by ½ inch bars were identified and the bars were labeled as Samples 1 through 4. Individual flexural strengths, yield displacements, secant Modulus, and tangent Modulus were reported.

Conditioning: All specimens were conditioned for a minimum of 48 hours at 70 F and 50% relative humidity. The densities of Samples 1 through 4 were determined to be 48.3, 49.1, 45.0 and 44.6, respectively.

Test Device: Instron Model 1122 Universal Testing Machine calibrated October 1995.

Load Capacity: 20,000 lbs.

Full Scale Load Range: 1,000 lbs.

Crosshead Speed: 0.2 in/min.

The following is a brief description of the ASTM test methods, c580, E447 and C99

ASTM C580—Flexural Strength And Module Of Chemical-Resistant Matter Grouts Monolithic Sufacings, And Polymer Concrete.

This method covers the determination of flexural strength and Modulus of elasticity in flexure of cured chemical-related materials in the form of molded rectangular beams. Flexural strength gives a numerical value for rigidity of the material. This value is used for comparison of like materials. The higher the value for Modulus of elasticity means a more rigid material.

ASTM B447—Compressive Strength Of Memory Prims Method A This method is used for determining comparative data on the compressive strength of masonry built in the laboratory with either different masonry units or mortar types, or both.

ASTM C99—Modulus Of Rupture Of Dimension Stone This test method covers the determination of the Modulus of rupture of all of dimension stone except slate. Secondly, this method is useful in indicating the differences in Modulus of rupture between the various dimension stones.

Note: Modulus of elasticity and Modulus of rupture are both express in PSI units. PSI=Pounds per Square Inch Results

| Specimen Number | Minutes Mixed | Flexural Strength (psi) | Yield Displacement (inch) | Secant Modulus (psi) | Tange Modulus |
|---|---|---|---|---|---|
| 1 | 5 | 1535 | 0.2520 | * | * |
| 2 | 5 | 1512 | 0.2548 | 2102 | 176,400 |
| 3 | 5 | 1561 | 0.3329 | 2506 | 141,200 |
| 4 | 3 | 1407 | 0.3083 | 3560 | 147,000 |

* The data acquisition system failed to compute the result.

The foregoing embodiments of the invention, and variations in the amounts, size, shape, materials and other details will become apparent to those skilled in the art. It is intended that all such variations and modifications which fall within the scope or spirit of the appended claims be embraced thereby.

What is claimed is:

1. A method for producing a lightweight, water resistant composition for building materials comprising:
   (a) mixing a first mixture comprising an epoxy resin, a lightweight aggregate, and a UV absorber in a rotary mixer;
   (b) mixing a second mixture comprising an epoxy hardener, a lightweight aggregate, and a UV absorber in a rotary mixer, and pumping in pressurized air until the second mixture is homogenized;
   (c) combining the first mixture and the second mixture in a rotary mixer, and pumping in pressurized air until the combined mixture is homogenized.

2. The method of claim 1 wherein the first mixture and the second mixture further comprise sodium bicarbonate and a viscosifier.

3. The method of claim 2 wherein the viscosifier comprises an acrylic ester polymer.

4. The method of claim 2 wherein the first mixture comprises the epoxy resin in an amount of a range of from about 55% to about 65% by weight of the first mixture, the lightweight aggregate in an amount of a range of from about 28% to about 32% by weight of the first mixture, the sodium bicarbonate in an amount of a range of from about 3% to about 5% by weight of the first mixture, the viscosifier in an amount of a range of from about 2% to about 4% by weight of the first mixture and the UV absorber in an amount of a range of from about 2% to about 4% by weight of the first mixture and the second mixture comprises the epoxy hardener in an amount of a range of from about 55% to about 65% by weight of the second mixture, the lightweight aggregate in an amount of a range of from about 28% to about 32% by weight of the second mixture, the sodium bicarbonate in an amount of a range of from about 3% to about 5% by weight of the second mixture, the viscosifier in an amount of a range of from about 2% to about 4% by weight of the second mixture and in the UV absorber in an amount of a range of from about 2% to about 4% by weight of the second mixture.

5. The method of claim 1 wherein the epoxy resin comprises a derivative of bisphenol A and epichlorohydrin.

6. The method of claim 1 wherein the epoxy hardener comprises an amine.

7. The method of claim 1 wherein the lightweight aggregate comprises vermiculite.

8. The method of claim 1 wherein the UV absorber is a substituted hydroxyphenyl benzotriazole.

9. The method of claim 1 wherein the rotary mixer is a centrifugal disc mixer comprising a co-rotating disk agitation system.

10. The method of claim 1 wherein the first mixture of (a) is rotated at a speed of at least 40 rpm.

11. The method of claim 1 wherein the second mixture of (b) is rotated at a speed of at least 1000 rpm.

12. The method of claim 1 wherein the first mixture and the second mixture of (c) are mixed by rotating at a speed of at least 1000 rpm.

13. The method of claim 1 wherein the pressurized air pumped into the second mixture of (b) is within a range of from 1 psi to 3 psi and is pumped in for a time period within the range of from about 5 minutes to about 10 minutes.

14. The method of claim 1 wherein the pressurized air pumped into the combined first mixture and second mixture of (c) is less than 1 psi and is pumped in for a time period within the range of from about 3 minutes to about 15 minutes.

15. The method of claim 1 wherein combined first mixture and second mixture are mixed for a period of time of at least 20 minutes.

16. A method for producing a lightweight, water resistant composition for building materials comprising:

(a) mixing a first mixture comprising an epoxy resin in an amount of a range of from about 55% to about 65% by weight of the first mixture, a lightweight aggregate in an amount of a range of from about 28% to about 32% by weight of the first mixture, and substituted hydroxyphenyl benzotriazole in an amount of a range of from about 2% to a range of about 4% by weight of the first mixture in a rotary mixer;

(b) mixing a second mixture comprising an epoxy hardener in an amount of a range of from about 55% to about 65% by weight of the second mixture, a lightweight aggregate in an amount of a range of from about 28% to about 32% by weight of the second mixture and substituted hydroxyphenyl benzotriazole in an amount of a range of from about 2 about 4% by weight of the second mixture in a rotary mixer and pumping in pressurized air within a range of from 1 psi to 3 psi until the second mixture is homogenized;

(c) combining the first mixture and the second mixture in a rotary mixer, and pumping in pressurized air at less than 1 psi until combined mixture is homogenized.

17. The method of claim 16 wherein the first mixture further comprises sodium bicarbonate in an amount of a range of from about 3% to about 5% by weight of the first mixture and an acrylic ester polymer in an amount of a range of from about 2% to about 4% by weight of the first mixture.

18. The method of claim 16 wherein the second mixture further comprises sodium bicarbonate in an amount of a range of from about 3% to about 5% by weight of the second mixture and an acrylic ester polymer in an amount of a range of from about 2% to about 4% by weight of the second mixture.

19. The method of claim 16 wherein the epoxy resin comprises an amount of about 60% by weight of the first mixture, the lightweight aggregate comprises an amount about 30% by weight of the first mixture, and the substituted hydroxyphenyl benzotriazole comprises an amount of 3% by weight of the first mixture, and the second mixture comprises the epoxy hardener in an amount of about 60% by weight of the second mixture, the lightweight aggregate comprises an amount of about 30% by weight of the second mixture and the substituted hydroxyphenyl benzotriazole comprises an amount of about 3% by weight of the second mixture.

20. The method of claim 17 wherein the first mixture comprises sodium bicarbonate in the amount of about 4% by weight of the first mixture and acrylic ester polymer in the amount of about 3% by weight of the first mixture.

21. The method of claim 18 wherein the second mixture comprises sodium bicarbonate in the amount of about 4% by weight of the second mixture and acrylic ester polymer in an amount of about 3% by weight of the second mixture.

22. The method of claim 16 wherein the rotary mixer is a centrifugal disc mixer comprising a co-rotating disk agitation system.

23. The method of claim 16 wherein the first mixture of (a) is rotated at a speed of at least 40 rpm.

24. The method of claim 16 wherein the second mixture of (b) is rotated at a speed of at least 1000 rpm.

25. The method of claim 16 wherein the first mixture and the second mixture of (c) are mixed by rotating at a speed of at least 1000 rpm.

26. The method of claim 17 wherein the combined first mixture and second mixture are mixed for a period of time of at least 20 minutes.

27. The method of claim 16 wherein the pressurized air is pumped into the second mixture of step (b) for a period of time ranging from about 5 minutes to about 10 minutes.

28. The method of claim 16 wherein the pressurized air is pumped into the combined first mixture and second mixture of step (c) for a period of time ranging from about 3 minutes to about 15 minutes.

29. The method of claim 16 further comprising applying the lightweight, water resistant composition as a coating on building materials.

30. The method of claim 16 further including:

(d) pouring the combined, homogenized mixture of (c) into various molds for forming building materials; and (e) allowing the combined, homogenized mixture of (c) to harden before use.

* * * * *